May 10, 1932. U. F. L. STEINDORFF ET AL 1,857,167
POWER DRIVEN SHEARS FOR CUTTING SHEET MATERIAL SUCH
AS METAL, LEATHER, CARDBOARD, OR THE LIKE
Filed May 20, 1927 2 Sheets-Sheet 2
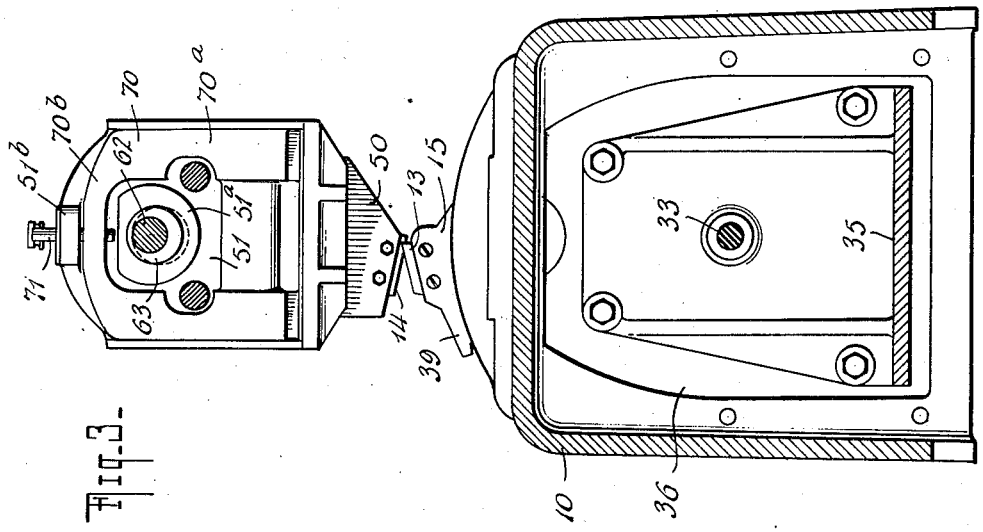
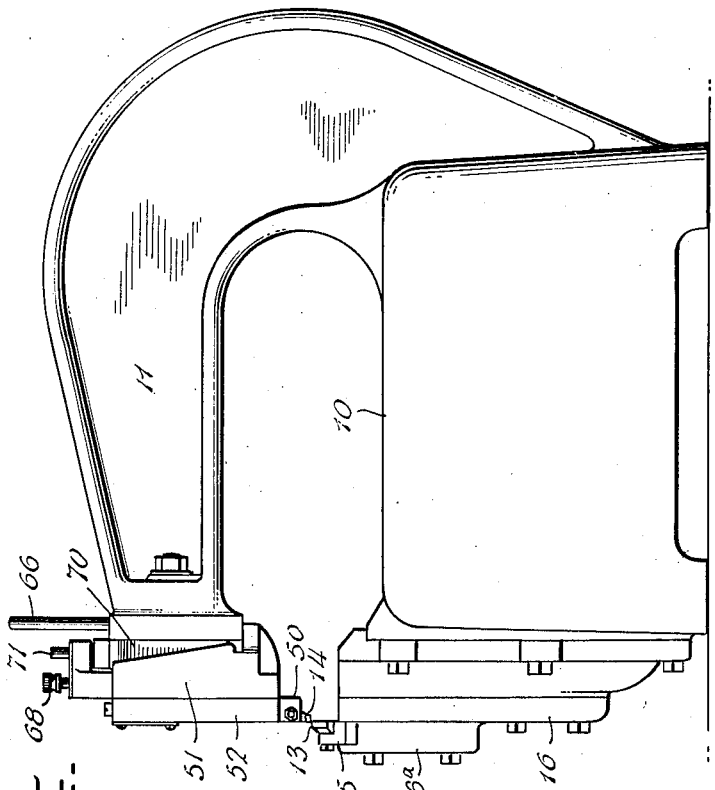
INVENTORS
ULRICH F. L. STEINDORFF,
HERBERT J. HELLER,
BY GUSTAVE A. UNGAR,
ATTORNEYS Patented May 10, 1932

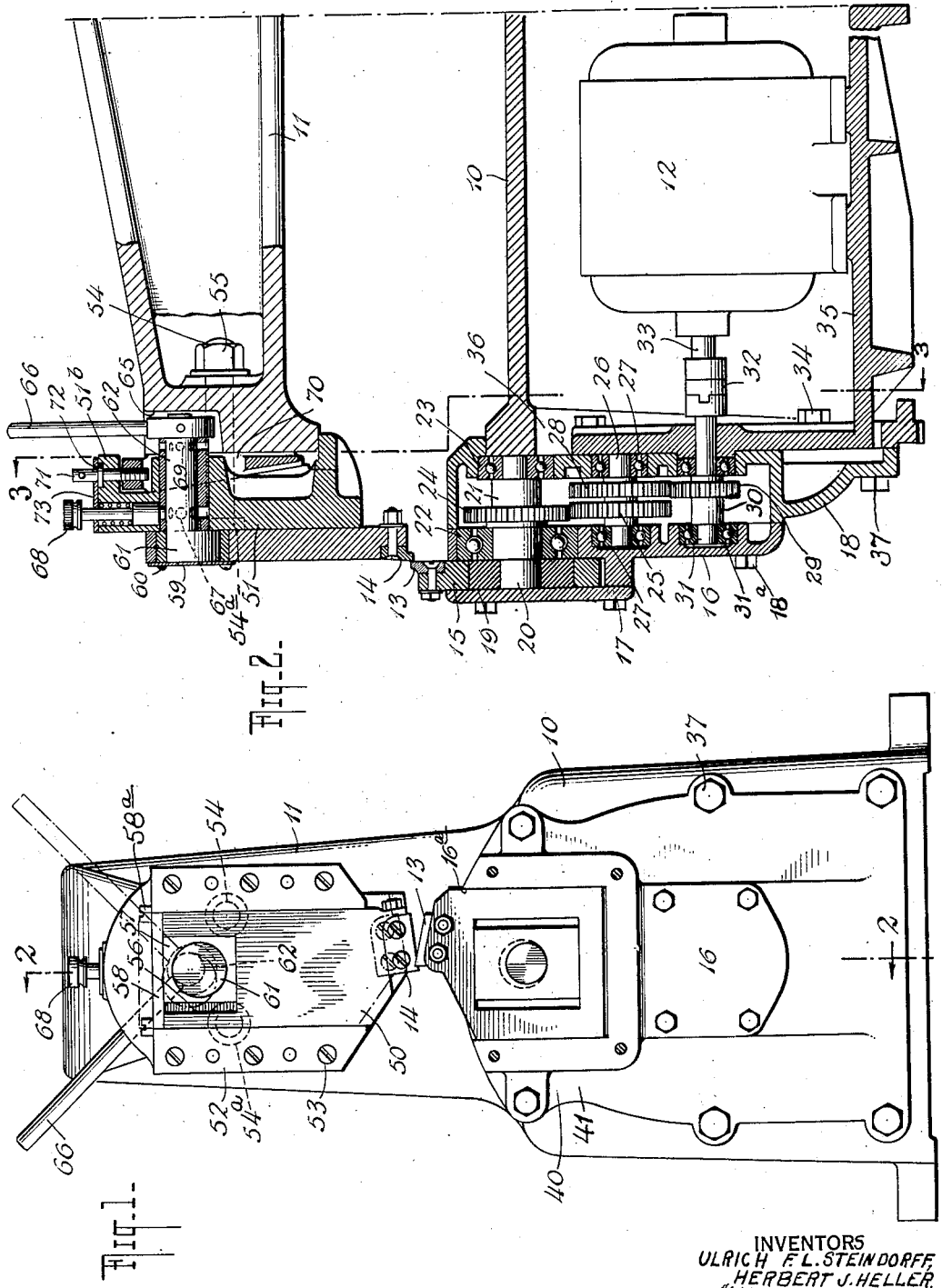

1,857,167

UNITED STATES PATENT OFFICE

ULRICH F. L. STEINDORFF AND HERBERT J. HELLER, OF NEW YORK, AND GUSTAVE A. UNGAR, OF PELHAM MANOR, NEW YORK; SAID UNGAR ASSIGNOR TO THE STANLEY WORKS, OF NEW BRITAIN, CONNECTICUT, A CORPORATION OF CONNECTICUT

POWER DRIVEN SHEARS FOR CUTTING SHEET MATERIAL SUCH AS METAL, LEATHER, CARDBOARD, OR THE LIKE

Application filed May 20, 1927. Serial No. 192,833.

This invention relates to cutting shears and particularly to power driven shears for cutting sheet material such as metal, leather, cardboard or the like. With power shears as heretofore constructed, a cut could be started only from the edge of the material being cut, whether such edge was the outer bounding edge of the material or an edge provided by drilling or punching a hole in the central part of the material. Therefore, if it was desired to cut out an inner portion of a sheet, it was necessary to provide an edge at which the cut could be started by punching or drilling a hole of sufficient size to provide a clearance for the cutting blades.

The principal object of the present invention is to provide a new and improved construction of a shears by means of which it is possible to start a shearing cut at any inner part of a sheet without having first to provide a hole at such part for starting the cut.

Another object is to provied a new and improved construction and mounting for the cutter holders of the shears, by means of which the relative positions of the effective cutting edges of the shears and also the clearance space between the shears may be adjusted with great accuracy.

A further object is to construct the motor mounting and driving mechanism for the movable shear blade or cutter as a unitary assembly, capable of being interchangeably secured to the main frames of many different sizes and types of shears. These and other objects, such as sturdiness and simplicity of construction, and reduction of manufacturing and maintenance costs will appear more fully from the following more detailed description and by reference to the accompanying drawings forming a part hereof and disclosing by way of illustration a satisfactory constructional example of a shears embodying the principles of our invention.

In the drawings Fig. 1 is a front elevation; Fig. 2 is a central vertical section taken substantially on the line 2—2 of Fig. 1; Fig. 3 is a section on the line 3—3 of Fig. 2, and Fig. 4 is a side elevation.

In the drawings we have shown a shears, the main frame of which comprises a hollow base 10 and a standard 11, which extends horizontally above the base and forms therewith a substantially U-shaped structure in accordance with the well known shape of devices of this character. The hollow base 10 forms a housing in which is mounted an electric motor 12 for driving the movable shear blade 13, while the standard 11 forms as a support for the stationary shear blade 14.

The movable shear blade 13 is seated within a cutout or mortise provided in a movable blade holder 15, which is slidably mounted within a guideway defined by a U-shaped outwardly projecting rib $16^a$ of a bearing plate 16. Secured to the rib $16^a$ and closing the front of the guideway formed thereby is a cover plate 17. The bearing plate 16 is in turn secured to a gear housing 18; any suitable means, such as the bolts $18^a$, which, as shown, pass through the bearing plate and are screwed into the housing 18 being provided for securing these parts together.

Slidably mounted within an elongated slot provided substantially at the center of the movable blade holder 15 is a bearing block 19 having engaged with its central bearing, an eccentric or crank throw 20 of a crank shaft 21, the crank shaft 21 being rotatably mounted within a pair of axially aligned ball bearings 22, 23, seated respectively in the bearing plate 16 and gear housing 18.

Secured to the shaft 21 between the ball bearings 22 and 23 is a gear 24, which meshes with an idler gear 25 secured upon an idler shaft 26, the latter preferably having its ends also mounted in ball bearings 27 seated in suitable recesses provided in the bearing plate 16 and gear housing 18. A second idler gear 28 also secured to the idler shaft 26 is in mesh with a driving pinion 29, secured to a main drive shaft 30, the latter preferably being mounted in ball bearings 31 in a manner similar to the shafts 21 and 26. One end of the main shaft 29 projects through the rear wall of the gear housing 18 and is connected by means of a flexible clutch 32 with the armature shaft 33 of the electric motor 12.

Bolted to the rear face of the gear housing 18, as by means of the bolts 34, is a bracket 35, upon which the electric motor 12 is suitably secured. The front wall of the hollow base 10 is provided with an aperture 36 of sufficient size to permit the passage therethrough of the bracket 35 with the motor 12 bolted in place thereon, so that after the shafts 21, 26 and 30, the ball bearings for said shafts, and the gears have been assembled, and placed within bearing plate 16 and the housing 18, said gear housing, with all the parts carried thereby, may be connected to the motor bracket 35 and, therefore, all of the driving parts of the machine may be assembled before such parts are secured to the main frame of the machine. After the parts have been so assembled, the gear housing 18 is bolted to the front face of the base 10 by means of the bolts 37.

The movable cutter holder 15 may be of any suitable construction and may be mounted in any suitable way so that the movable blade 13 will have imparted thereto, by the motor 12, through the medium of the reduction gears above described, a rapid reciprocation of relatively small amplitude. In the particular constructional example disclosed, we have shown the movable blade holder as being slidably mounted in the U-shaped guideway 16$^a$ so as to be constrained to move with a straight line reciprocation when it is actuated by the eccentric throw of the crank shaft 21. The particular manner of mounting the movable blade holder and the mechanism for operating it may, however, be varied considerably from that shown.

For the purpose of permitting a shearing cut to be started at any inner portion of a sheet of material, the shear blade 14 is mounted in a mortise or cutout formed in an upper blade holder 50. The side edges of the blade holder 50 are dovetailed and fit slidably in similarly dovetailed guides formed between the front face of a bracket 51 and retaining plates 52, the latter being secured to said bracket by means of the screws 53. The bracket 51 is clamped to the front face of the standard 11 by means of a pair of bolts 54, having at their front end, flat heads 54$^a$, seated within recesses provided in the front face of said bracket, and having at their rear ends, nuts 55, by means of which said bolts are caused to clamp the bracket in position. At its upper end the blade holder 50 is provided with a slot 56, in which a bearing block 57 is seated, said block being retained within said slot by means of a top bar 58, secured to the top of blade holder 50 by the screws 58$^a$. The bar 58 bridges the top of said slot as clearly shown in Fig. 1 and prevents relative vertical movement between the bearing block and blade holder. Movement of the bearing block transversely of the blade holder 50 is prevented by the engagement of the rear face of the block with the front face of the bracket 51 and by a front plate 59 suitably secured to the blade holder 50 by any suitable means, such as the small screws 60. Rotatably mounted within a central aperture of the bearing block 57 is an eccentric throw 61 provided upon one end of an adjusting shaft 62, which is mounted for rotatable adjustment within an eccentric sleeve 63, the latter being also mounted for rotatable adjustment within the bracket 51. The rear end of the adjusting shaft 62 projects outwardly beyond the eccentric adjusting sleeve 63 and said shaft and sleeve both project rearwardly beyond the bracket 51 in the recess or clearance space 65 provided in the upper front end of the standard 11, as clearly shown in Fig. 2 of the drawings. Secured to the rear end of the adjusting shaft 62 is an actuating handle 66, by means of which the shaft may be rotated. Rotation of the shaft 62 obviously will cause the eccentric throw 61 thereof to move the blade holder 50 and the blade 14 carried thereby towards or away from the lower blade 13 in a manner which will be readily understood. The eccentric throw 61 is so located that, when the blade holder 50 and its blade 14 are moved to the operative position shown in Fig. 1 of the drawings, upward pressure upon the blade 14, resulting from a shearing cut, will not cause the eccentric adjusting shaft to be rotated, because of the fact that the throw of the eccentric is at its lowermost limit and thereby serves to lock the parts against accidental movement.

The eccentric bushing or sleeve 63 is provided for the purpose of enabling the relative vertical position of the upper blade 14 to the lower blade 13 to be adjusted accurately, thereby to secure the most effective shearing action. As clearly shown in Fig. 2 of the drawings, the eccentric sleeve 63 is provided with a plurality of spaced holes 67 extending about the sleeve. A spring pressed plunger 68, mounted within the upper end of the bracket 51, has its lower end provided with a reduced teat which is adapted to be engaged with any one of the holes 67 to prevent rotation of the sleeve 63. Any suitable means may be provided for rotating the sleeve 63 to produce vertical movement of the bracket 51 and the blade holder 50 carried thereby; we have shown such means as consisting of a plurality of holes 69, provided in the rear projecting end of the sleeve and in which holes a rod or spanner wrench may be inserted for rotating the sleeve.

In order to provide for lateral adjustment of the blade 14 relatively to the blade 13, a tapered wedge 70 is interposed between the rear face of the bracket 51 and the front face of the standard 11. This wedge, shown most clearly in Fig. 3 of the drawings, is in the shape of an inverted U, the legs 70$^a$ of which are tapered, and said legs are connected at the top thereof by a web or bridge 70$^b$. As clearly shown in Fig. 3, the legs 70$^a$ of the wedge straddle the boss 51ª of the bracket 51 through which boss the adjusting shaft and eccentric sleeve 63 project. The top web 70ᵇ of the wedge has screwed therein an adjusting screw 71 which passes rotatably through a rearwardly projecting lug 51ᵇ, see Fig. 2, provided at the top of the bracket 51. The screw 71 is held against movement relatively to the bracket by means of a shoulder 72 provided on the screw which seats within a recess provided in the top of the lug 51ᵇ and is held within said recess by a plate 73, suitably secured to the top of the bracket.

When it is desired to adjust the blade 14 either laterally or vertically, the nuts 55 on the clamping bolts 54 are loosened and if a vertical adjustment is to be made, the spring pressed locking pin 68 is raised and rotation of the sleeve 63 is effected by means of any suitable tool inserted in the holes 69, it being understood that, as shown in Fig. 2, such holes are readily accessible through the open top of the recess 65. If lateral adjustment of the blade 14 is to be made, it will be obvious that rotation of the screw 71 will cause the wedge 70 to be actuated either downwardly or upwardly, as desired, to bring the blade 14 closer to or farther from the blade 13.

The operation of the movable blade driving means will be readily understood, rotation of the motor 12 producing through the gears 29, 28, 25 and 24 a rotation of the crank shaft 21. As the crank shaft 21 rotates, its eccentric throw obviously will produce an oscillation or reciprocation of the movable blade holder 50 upon the fixed pivot bolt 38, thus causing a rapid reciprocation of the cutting blade 13 relatively to the stationary blade 14 with a stroke of small amplitude.

If it is desired to start the shearing cut at any inner portion of a sheet, the upper blade 14 is raised, from the operative position shown in Fig. 1 of the drawings, by means of the handle 66 to the dotted line position of the parts indicated in said figure. The sheet is then inserted in the open space between the blades, and the motor 20 is started to cause reciprocation of the movable blade. The upper blade is then lowered by means of the handle 66 to its operative position. As the upper blade is lowered the sharp pointed inner edges of the cutting blades are caused to penetrate the sheet, and after the handle 66 is moved to the full line position shown in Fig. 1, the operation of performing the shearing cut can be proceeded with in the usual manner.

It will be noted that the construction of the gear housing 18 and the parts carried thereby permits the complete assembly of the lower blade holder and its driving means before any of such parts are mounted upon the main frame and that, as the motor bracket 12 is secured to the rear face of the gear housing, all of the movable parts can be assembled as a unit, which unit is capable, after it has been completely assembled, of being connected with any suitable base or standard. In the construction of smaller shears of the type designated by us as open shear heads such as disclosed in the co-pending application of Ulrich F. L. Steindorff and Herbert J. Heller, Serial #64,750, filed October 26, 1925, a cover plate, either having an anvil formed integrally therewith, or having means for securing an anvil detachably thereto, may be substituted for the cover plate 17, such as shown in the present application; the anvil being provided with means for carrying the stationary upper blade.

While we have shown a movable blade holder as slidably mounted for reciprocation in a straight line, it will be understood that the principles of the invention herein described are not limited to any particular construction of the movable blade holder or of the means for actuating it, but that any suitable mounting and driving means capable of securing a rapid reciprocation of the movable blade in a stroke of small amplitude, may be resorted to. It will likewise be understood that many variations, changes and modifications from the specific constructional details of the other parts of the shears may be resorted to without departing from the principles of our invention.

We claim:

1. In a shears, a supporting framework having a standard, a movable blade and actuating mechanism therefor, a normally stationary blade mounted on said standard for vertical and lateral adjustment towards and from said movable blade, and means for adjusting said stationary blade laterally, comprising a bracket, said bracket having a guideway in which said blade is mounted for vertical adjustment, and a wedge interposed between said bracket and standard for adjusting said bracket and the blade carried thereby laterally of the movable blade.

2. In a shears, a supporting framework having a standard, a movable blade and actuating mechanism therefor, a normally stationary blade mounted on said standard for vertical and lateral adjustment towards and from said movable blade, and means for adjusting said stationary blade laterally, comprising a bracket upon which said blade is mounted, a wedge interposed between said bracket and standard, and means for moving said wedge longitudinally of said standard and an eccentric for adjusting said blade vertically in said bracket.

3. In a shears, a supporting framework having a standard, a movable blade and actuating mechanism therefor, a normally stationary blade mounted on said standard for vertical and lateral adjustment towards and from said movable blade, and means for adjusting said stationary blade laterally, comprising a bracket upon which said blade is mounted, a wedge interposed between said bracket and standard, and screwthreaded means in engagement with said wedge for causing it to be moved laterally of said standard, said bracket being provided with a guideway, a blade carrier slidably mounted in said guideway, an eccentric shaft having its throw in eingagement with said blade carrier, an eccentric bearing in which said shaft is mounted and means to permit independent manual operation of said shaft and eccentric.

In testimony whereof we have hereunto set our hands.

ULRICH F. L. STEINDORFF.
HERBERT J. HELLER.
GUSTAVE A. UNGAR.